US012098734B2

(12) United States Patent
Nakano et al.

(10) Patent No.: US 12,098,734 B2
(45) Date of Patent: Sep. 24, 2024

(54) ELECTRIC FLUID PRESSURE CYLINDER AND MOVING STRUCTURE BODY

(71) Applicant: KYB Corporation, Tokyo (JP)

(72) Inventors: Tomokazu Nakano, Gifu (JP); Daisuke Tanaka, Gifu (JP); Yuuzou Masuta, Gifu (JP)

(73) Assignee: KYB CORPORATION, Tokyo (JP)

( * ) Notice: Subject to any disclaimer, the term of this patent is extended or adjusted under 35 U.S.C. 154(b) by 88 days.

(21) Appl. No.: 17/996,274

(22) PCT Filed: Apr. 6, 2021

(86) PCT No.: PCT/JP2021/014600
§ 371 (c)(1),
(2) Date: Oct. 14, 2022

(87) PCT Pub. No.: WO2021/210450
PCT Pub. Date: Oct. 21, 2021

(65) Prior Publication Data

US 2023/0193930 A1 Jun. 22, 2023

(30) Foreign Application Priority Data

Apr. 17, 2020 (JP) ................................ 2020-074248

(51) Int. Cl.
*F15B 11/10* (2006.01)
*F04B 17/03* (2006.01)
(Continued)

(52) U.S. Cl.
CPC .............. *F15B 11/10* (2013.01); *F04B 17/03* (2013.01); *F15B 13/00* (2013.01); *F15B 15/14* (2013.01)

(58) Field of Classification Search
CPC .................... F15B 15/149; F15B 15/20; F15B 2211/20515; F15B 15/18; E02F 9/2271
See application file for complete search history.

(56) References Cited

U.S. PATENT DOCUMENTS 3,718,110 A * 2/1973 Blanchard ............ B63H 20/106 440/61 R
3,800,537 A * 4/1974 Denis ........................ B66F 3/24 60/484
(Continued)

FOREIGN PATENT DOCUMENTS

JP S5840474 U 3/1983
JP S59164805 U 11/1984
(Continued)

*Primary Examiner* — Thomas E Lazo
(74) *Attorney, Agent, or Firm* — Rabin & Berdo, P.C.

(57) ABSTRACT

An electric fluid pressure cylinder is provided with: a driving unit integrally provided with an electric motor, a pump configured to discharge working oil by being driven by the electric motor, and a tank; a hydraulic cylinder configured to be extended and contracted by the working oil supplied from the driving unit; and a first hose pipe and a second hose pipe configured to guide the working oil between the driving unit and the hydraulic cylinder. The driving unit is further provided with: a valve block configured to control the flow of working fluid between the fluid pressure cylinder and the pump; and a connecting plate attached to the valve block and formed with a connecting port to which the pipe member is connected, the connecting port being configured such that the working fluid supplied to and discharged from the fluid pressure cylinder passes through the connecting port.

7 Claims, 10 Drawing Sheets

(51) Int. Cl.
*F15B 13/00* (2006.01)
*F15B 15/14* (2006.01)

(56) References Cited

U.S. PATENT DOCUMENTS

| | | | | | |
|---|---|---|---|---|---|
| 3,809,343 | A * | 5/1974 | Adams | B63H 20/106 | 248/642 |
| 3,875,850 | A * | 4/1975 | Reynolds | B62D 33/07 | 91/468 |
| 4,739,854 | A * | 4/1988 | Sabel | B62D 33/07 | 180/89.15 |
| 4,860,638 | A * | 8/1989 | Hosono | F15B 15/149 | 137/884 |
| 5,720,214 | A * | 2/1998 | Kawamura | E02F 9/2271 | 91/530 |
| 5,928,041 | A * | 7/1999 | Anderson | B63H 20/12 | 440/61 C |
| 5,975,967 | A * | 11/1999 | Nishi | F15B 15/1438 | 29/523 |
| 6,044,752 | A * | 4/2000 | Harigaya | F15B 15/1433 | 92/163 |
| 7,069,675 | B2 * | 7/2006 | Nishi | E02F 9/2271 | 37/236 |
| 7,343,740 | B2 * | 3/2008 | Sakai | F15B 21/041 | 60/453 |
| 8,015,913 | B2 * | 9/2011 | Kriegsmann | F15B 15/149 | 92/163 |
| 8,657,637 | B1 * | 2/2014 | Pelini | B63H 20/106 | 440/61 R |
| 10,066,650 | B2 * | 9/2018 | Tanaka | F15B 15/1423 | |
| 10,293,906 | B1 * | 5/2019 | Pelini | B63H 20/106 | |
| 10,794,404 | B2 * | 10/2020 | Tanaka | F15B 11/08 | |
| 2006/0242957 | A1 * | 11/2006 | Sakai | F15B 21/041 | 60/453 |
| 2011/0111654 | A1 * | 5/2011 | Porta | B63H 20/106 | 440/61 R |
| 2017/0159677 | A1 * | 6/2017 | Besch | F15B 1/265 | |
| 2018/0128291 | A1 * | 5/2018 | Sefcik | F15B 15/1433 | |
| 2019/0226504 | A1 * | 7/2019 | Richter | F15B 11/10 | |
| 2019/0234431 | A1 * | 8/2019 | Tanaka | F15B 11/044 | |
| 2020/0398963 | A1 * | 12/2020 | Miyashita | B63H 20/106 | |

FOREIGN PATENT DOCUMENTS

| | | |
|---|---|---|
| JP | S6399008 U | 6/1988 |
| JP | 2018091386 A | 6/2018 |
| JP | 2020026815 A | 2/2020 |

* cited by examiner

ELECTRIC FLUID PRESSURE CYLINDER AND MOVING STRUCTURE BODY

TECHNICAL FIELD

The present invention relates to an electric fluid pressure cylinder and moving structure body.

BACKGROUND ART

JP2018-91386A discloses an electric fluid pressure linear actuator in which a cylinder is arranged on the lower side, and a working oil tank, a working oil pump unit, and an electric motor are arranged on the cylinder.

SUMMARY OF INVENTION

The electric fluid pressure cylinder as disclosed in JP2018-91386A and that is configured by making the fluid pressure cylinder, the tank, the pump, and the electric motor into a unit is used in various applications because it can achieve a high power with a compact configuration.

There has been a demand for replacing an existing fluid pressure cylinder, a gas spring, an electric linear actuator, and so forth with the electric fluid pressure cylinder as described above. However, when the replacement of the existing fluid pressure cylinder with the electric fluid pressure cylinder is to be considered, it is required to investigate whether or not the tank, the pump, the electric motor, and so forth that are integrated to the fluid pressure cylinder interfere with other devices or equipment, and there has been a case in which such an interference has prevented the replacement.

An object of the present invention is to provide an electric fluid pressure cylinder with improved freedom of an arrangement layout.

According to one aspect of the present invention, an electric fluid pressure cylinder includes: a driving unit integrally provided with an electric motor rotated by an electrical power supply, a pump configured to discharge working fluid by being driven by the electric motor, and a tank configured to store the working fluid; a fluid pressure cylinder configured to be extended and contracted by the working fluid supplied from the driving unit; and a pipe member configured to guide the working fluid between the driving unit and the fluid pressure cylinder, wherein the driving unit is further provided with: a valve block configured to control flow of the working fluid between the fluid pressure cylinder and the pump; and a connecting member attached to the valve block and formed with a connecting port to which the pipe member is connected, the connecting port being configured such that the working fluid supplied to and discharged from the fluid pressure cylinder passes through the connecting port.

DESCRIPTION OF EMBODIMENTS

In the following, an electric fluid pressure cylinder 100 according to an embodiment of the present invention and a moving structure body 101 including the same will be described with reference to the drawings.

The configuration of the electric fluid pressure cylinder 100 will be described with reference to FIGS. 1 to 6.

Figure 1:
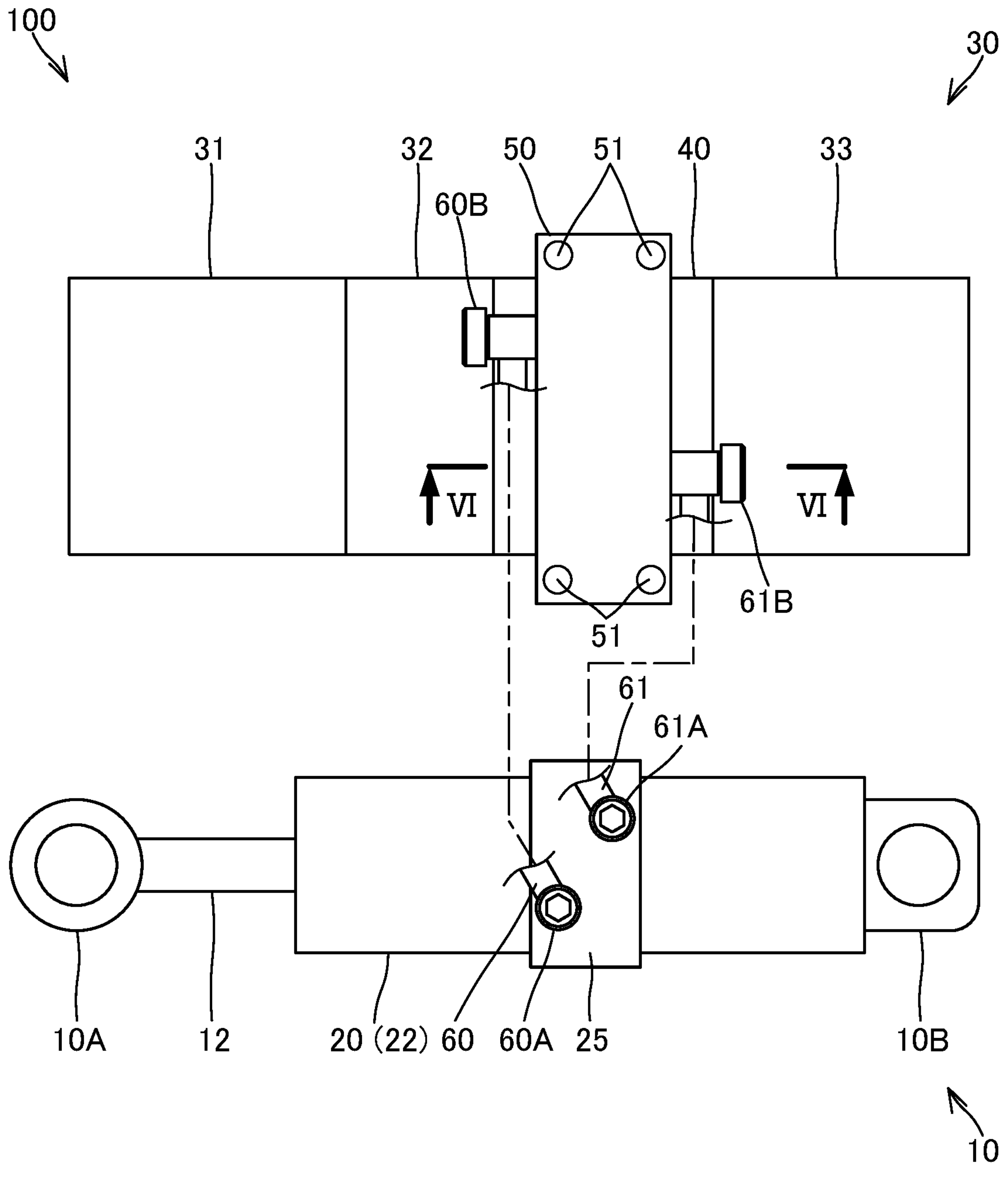
FIG. 1 is a schematic view showing a configuration of an electric fluid pressure cylinder according to an embodiment of the present invention.

As shown in FIG. 1, the electric fluid pressure cylinder 100 is provided with: a hydraulic cylinder 10 serving as a fluid pressure cylinder that is extended and contracted by having a cylinder member 20 and a piston rod 12 that is moved rearward and forward relative to the cylinder member 20; a driving unit 30 that includes an electric motor 31 and drives the hydraulic cylinder 10; and a first hose pipe 60 (a first pipe) and a second hose pipe 61 (a second pipe) each serving as a pipe member that connects the hydraulic cylinder 10 and the driving unit 30.

Figure 2:
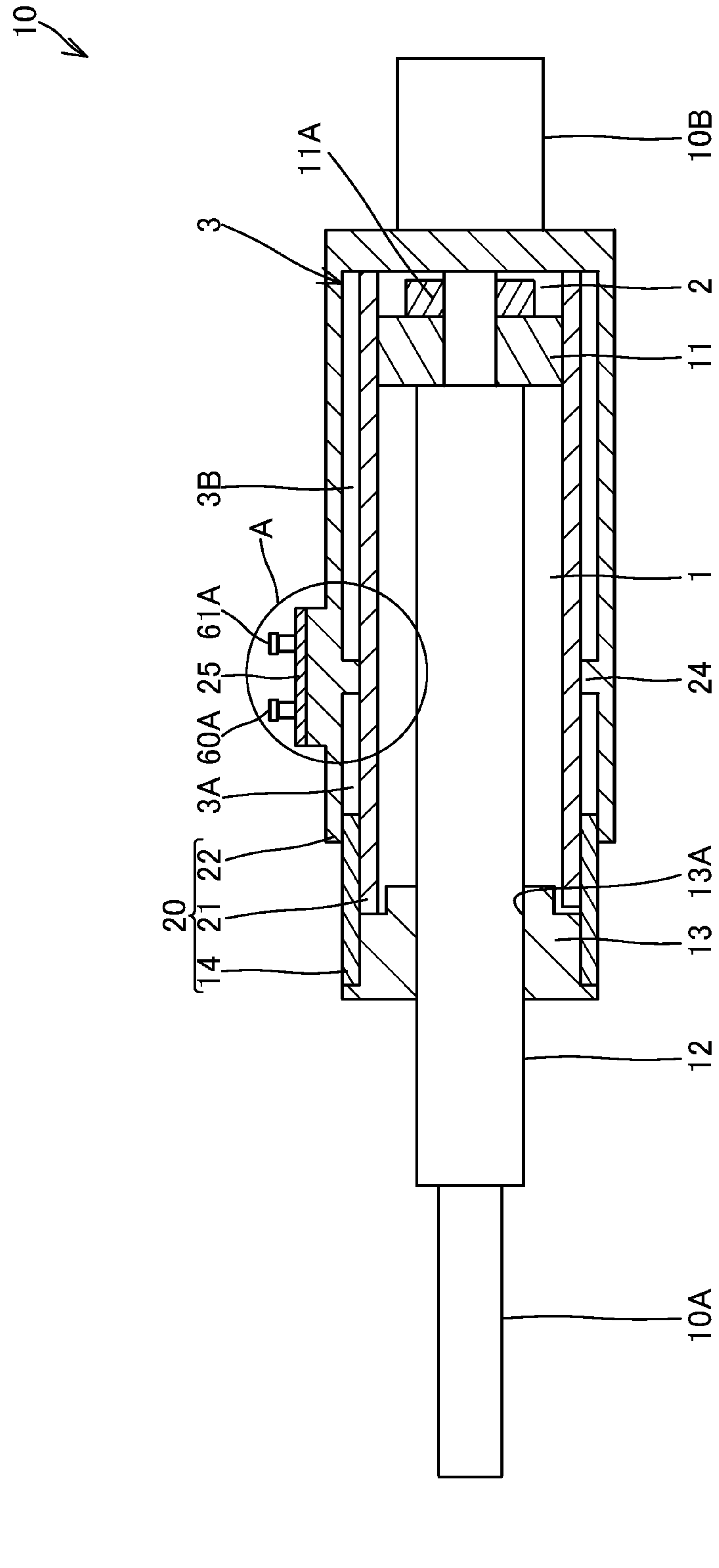
FIG. 2 is a sectional view of a hydraulic cylinder of the electric fluid pressure cylinder according to the embodiment of the present invention.

As shown in FIGS. 1 and 2, the hydraulic cylinder 10 has the cylinder member 20, the piston rod 12 that is moved rearward and forward relative to the cylinder member 20, and a piston 11 that is connected to the piston rod 12.

The cylinder member 20 has a cylinder tube 21 having a cylindrical shape, a cylinder body 22 having a bottomed cylindrical shape that is arranged on an outer circumferential side of the cylinder tube 21, and an outer tube 14 that is threaded to an opening end portion of the cylinder body 22. As described above, the hydraulic cylinder 10 is a so-called twin-tube hydraulic cylinder in which the cylinder member 20 is configured of the cylinder tube 21, the cylinder body 22, and the outer tube 14.

As shown in FIG. 2, the one end portion of the outer tube 14 is joined with the rod guide 13 by being threaded to an outer circumference of a rod guide 13 that freely slidably supports the piston rod 12. The other end of the outer tube 14 is joined with the cylinder body 22 by being threaded to an inner circumference of the cylinder body 22. The rod guide 13 and the cylinder body 22 are joined by the outer tube 14, and the cylinder tube 21 is clamped by the rod guide 13 and a bottom portion of the cylinder body 22.

The piston 11 is inserted into the cylinder tube 21 in a freely slidable manner and divides an interior of the cylinder tube 21 into a rod side chamber 1 and a bottom-side chamber 2 (a first fluid pressure chamber and a second fluid pressure chamber). The rod side chamber 1 and the bottom-side chamber 2 that are formed in the cylinder tube 21 by the piston 11 are respectively filled with working oil.

A tip end of the piston rod 12 projects out from the cylinder member 20 via an insertion hole 13A formed in the rod guide 13, and a base end of the piston rod 12 is connected to the piston 11 via a nut 11A. In addition, a clevis 10A is provided on the tip end of the piston rod 12.

The cylinder body 22 is provided so as to cover the cylinder tube 21 from the outer circumference thereof. A clevis 10B is provided on the bottom portion of the cylinder body 22 (an closing end).

An annular space 3 is formed between an inner circumferential surface of the cylinder body 22 and the outer circumferential surface of the cylinder tube 21. An opening end of the cylinder body 22 is joined with the rod guide 13 via the outer tube 14. Specifically, the opening end of the cylinder body 22 is threaded to an outer circumference of the outer tube 14. With such a configuration, the cylinder body 22 is joined with the cylinder tube 21 via the outer tube 14.

Figure 3:
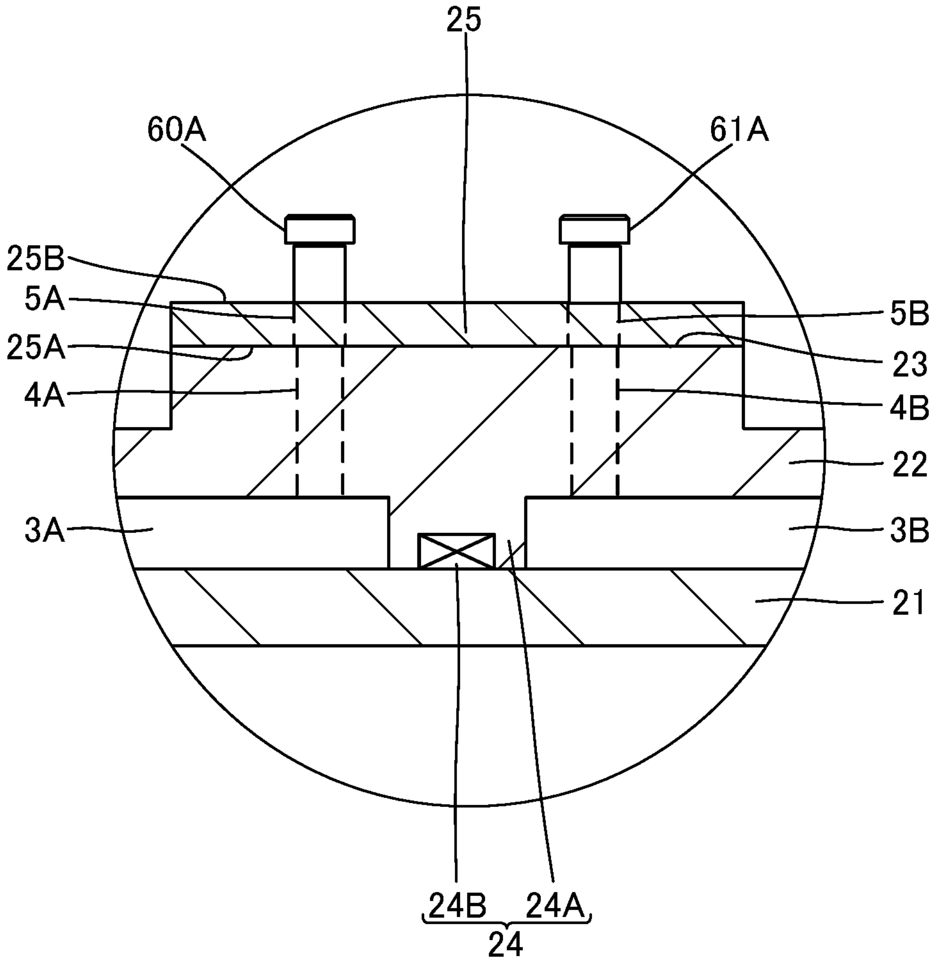
FIG. 3 is an enlarged view of a portion A in FIG. 2.

The inner circumference of the cylinder body 22 is provided with a partitioning portion 24 that partitions the annular space 3 between the cylinder body 22 and the cylinder tube 21 into a first outer pressure chamber 3A and a second outer pressure chamber 3B. As shown in FIG. 3, the partitioning portion 24 has: an annular projecting portion 24A that is formed integrally with the cylinder body 22 and that projects radially inward from the inner circumferential surface of the cylinder body 22; and a seal member 24B that is provided in the projecting portion 24A and that seals a gap between the projecting portion 24A and the outer circumferential surface of the cylinder tube 21.

The first outer pressure chamber 3A communicates with the rod side chamber 1 through a passage (not shown) formed between the cylinder tube 21 and the outer tube 14. The second outer pressure chamber 3B communicates with the bottom-side chamber 2 through a passage (not shown) formed between the cylinder tube 21 and the bottom portion of the cylinder body 22.

As shown in FIG. 3, the cylinder body 22 is formed with a first communicating port 4A that is in communication with the first outer pressure chamber 3A, a second communicating port 4B that is in communication with the second outer pressure chamber 3B, and an attachment surface 23 on which a cylinder plate 25 serving as a cylinder connecting member, which will be described later, is attached.

The attachment surface 23 is a flat surface that formed on an outer circumference of the cylinder body 22.

Figure 4:
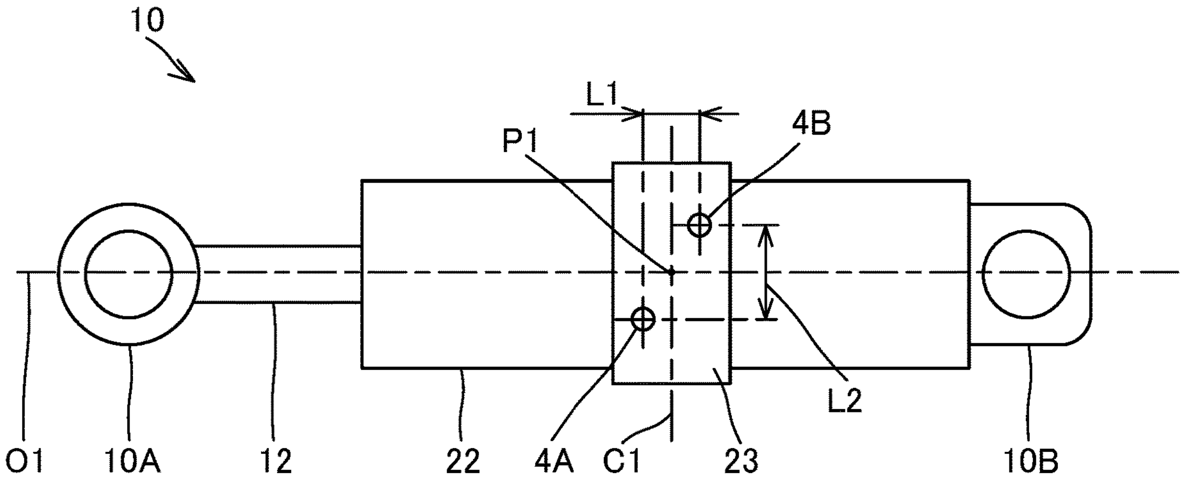
FIG. 4 is a plan view of the hydraulic cylinder of the electric fluid pressure cylinder according to the embodiment of the present invention.

The first communicating port 4A and the second communicating port 4B are formed so as to extend in the radial direction of the cylinder body 22 and respectively open at the attachment surface 23. In addition, as shown in FIG. 4, on the attachment surface 23, the first communicating port 4A and the second communicating port 4B are formed so as to be shifted in the center axis O1 direction (the left-right direction in the figure) of the cylinder body 22 and are formed so as to be shifted in the orthogonal direction (the up-down direction in the figure) with respect to the center axis O1. In other words, when viewed in a planar view shown in FIG. 4, the first communicating port 4A and the second communicating port 4B are formed so as to be point-symmetrical with each other about an intersection point P1 of the center axis O1 of the cylinder body 22 and an axis C1 that extends through the center between the first communicating port 4A and the second communicating port 4B and that is orthogonal to the center axis O1.

As shown in FIG. 3, the hydraulic cylinder 10 is provided with the cylinder plate 25 serving as the cylinder connecting member that is removably attached to the attachment surface 23 of the cylinder body 22. The cylinder plate 25 is a flat plate member having a pair of parallel flat surfaces (hereinafter, one of the flat surfaces will be referred to as a reference surface 25A, and the other will be referred to as a connecting surface 25B), and the cylinder plate 25 is attached to the cylinder body 22 in a state in which the flat reference surface 25A is brought into contact with the attachment surface 23 of the cylinder body 22.

The cylinder plate 25 is formed with a first cylinder port 5A that is in communication with the first communicating port 4A and a second cylinder port 5B that is in communication with the second communicating port 4B in a state in which the cylinder plate 25 is attached to the cylinder body 22. The first cylinder port 5A and the second cylinder port 5B respectively open at the connecting surface 25B of the cylinder plate 25.

In the hydraulic cylinder 10, as the working oil is supplied to the bottom-side chamber 2 and the working oil is discharged from the rod side chamber 1, the piston rod 12 is moved in the extending direction (the left direction in FIG. 2). In addition, in the hydraulic cylinder 10, as the working oil is supplied to the rod side chamber 1 and the working oil is discharged from the bottom-side chamber 2, the piston rod 12 is moved in the contracting direction (the right direction in FIG. 2). As described above, the hydraulic cylinder 10 is a so-called double acting cylinder.

As shown in FIG. 1, the driving unit 30 integrally has: the electric motor 31 that is rotationally driven by an electrical power supply; a pump 32 that is driven by the electric motor 31 to discharge the working oil; a tank 33 that stores the working oil; a valve block 40 that controls flows of the working oil between the hydraulic cylinder 10 and the pump 32; and a connecting plate 50 serving as a connecting member that is attached to the valve block 40 and that is formed with a first connecting port 7A and a second connecting port 7B that are respectively connected to the first and second hose pipes 60 and 61 such that the working oil to be supplied to and discharged from the hydraulic cylinder 10 flows through. In other words, the electric motor 31, the pump 32, the tank 33, the valve block 40, and the connecting plate 50 configures the driving unit 30 as a single unit. A part or all of the respective components of the driving unit 30 configured as the unit may be integrally configured as a single part. For example, the pump 32 and the valve block 40 may be configured as a single part, and the thus-configured single part may be formed into the unit together with other component parts including the electric motor 31, etc. to form the driving unit 30. In addition, for example, the electric motor 31 and the valve block 40 may be configured as a single part.

The electric motor 31 is a DC brushed motor. In the electric motor 31, the rotation is, for example, controlled by supplying the electrical power under a PWM control performed by an inverter. A type of the electric motor 31 and a control method thereof is not limited thereto, and it may be possible to employ other configurations.

The pump 32 is a gear pump that is linked to a rotation shaft of the electric motor 31 (not shown) and that is driven by the rotation of the electric motor 31. The discharging direction of the working oil discharged from the pump 32 is selectively switched in accordance with the rotation direction of the electric motor 31.

Figure 5:
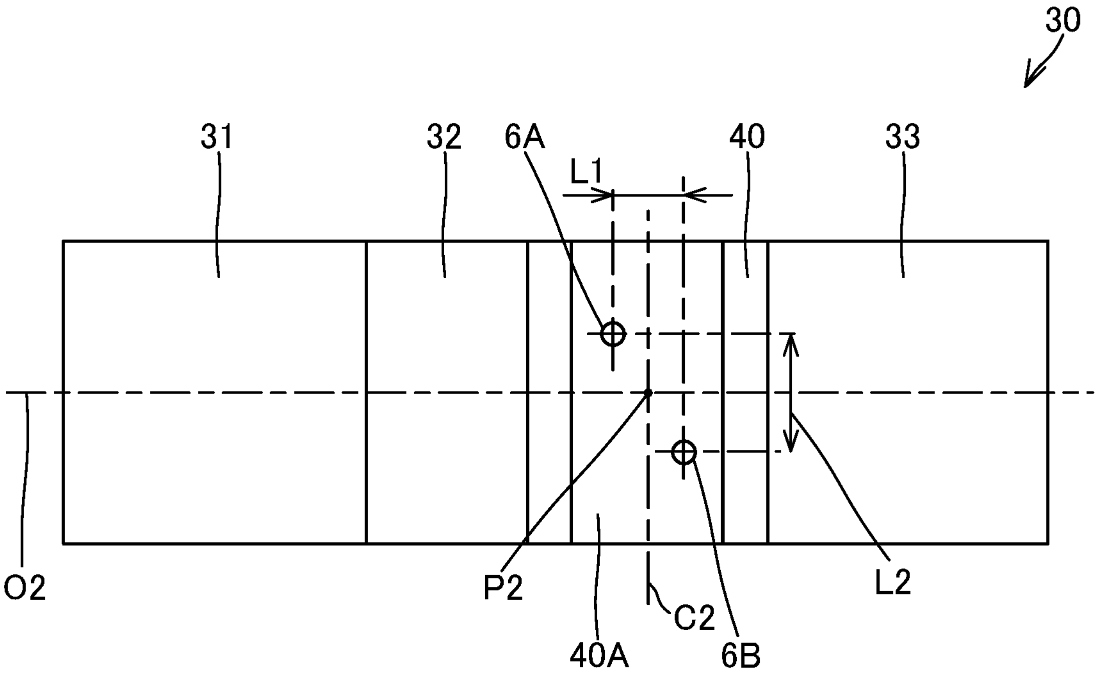
FIG. 5 is a plan view of a driving unit of the electric fluid pressure cylinder according to the embodiment of the present invention and is a view showing a state in which a connecting plate is removed.
Figure 6:
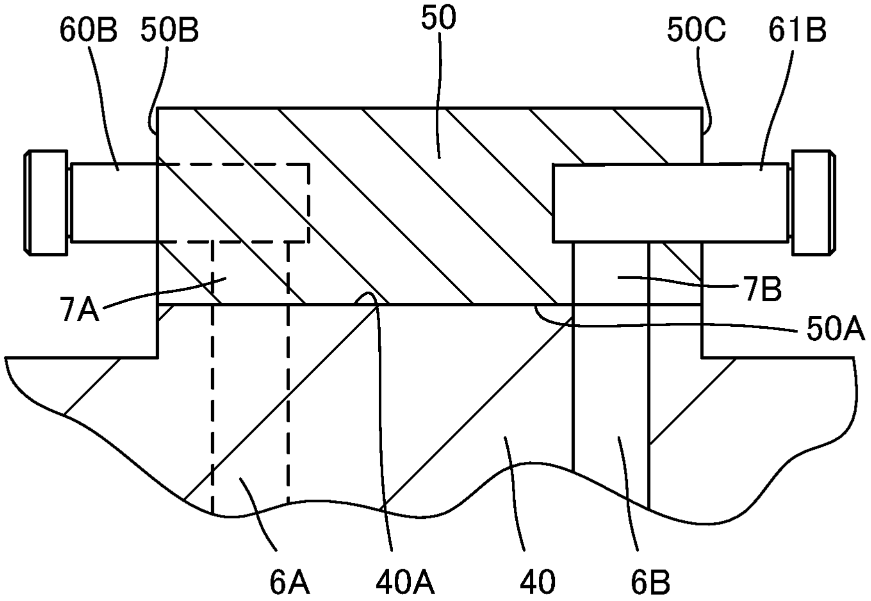
FIG. 6 is a sectional view taken along line IV-IV in FIG. 1.

As shown in FIGS. 5 and 6, the valve block 40 is formed with a flat attachment surface 40A to which the connecting plate 50 is attached and a first valve port 6A and a second valve port 6B that respectively open at the attachment surface 40A.

The valve block 40 has a control valve, an operated check valve, a slow return valve, and so forth (not shown) and controls the flow of the working oil between the hydraulic cylinder 10 and the pump 32 (in a strict sense, the flow of the working oil between the pump 32/the tank 33 and the first valve port 6A/the second valve port 6B).

As shown in FIG. 6, the connecting plate 50 is a flat plate member having a flat reference surface 50A that is in contact with the attachment surface 40A of the valve block 40. The connecting plate 50 is removably attached to the valve block 40 in a state in which the reference surface 50A is in contact with the attachment surface 40A of the valve block 40.

The connecting plate 50 is formed with the first connecting port 7A and the second connecting port 7B each serving as a connecting port. The one end and the other end of the first connecting port 7A open at the reference surface 50A and a side surface 50B of the connecting plate 50, respectively. The one end and the other end of the second connecting port 7B open at the reference surface 50A and a side surface 50C of the connecting plate 50, respectively. In a state in which the connecting plate 50 is attached to the valve block 40, the one end of the first connecting port 7A communicates with the first valve port 6A of the valve block 40, and the one end of the second connecting port 7B communicates with the second valve port 6B of the valve block 40.

The first hose pipe 60 and the second hose pipe 61 are each formed of a material having a flexibility (plasticity).

The one end of the first hose pipe 60 is connected to the first communicating port 4A via a connector 60A that is attached to an opening portion of the first communicating port 4A opening at the connecting surface 25B of the cylinder plate 25. The other end of the first hose pipe 60 is connected to the first connecting port 7A via a connector 60B that is attached to an opening portion of the first connecting port 7A opening at the side surface 50B of the connecting plate 50. With such a configuration, the first communicating port 4A is communicated with the first connecting port 7A via the first hose pipe 60.

Similarly, the one end of the second hose pipe 61 is connected to the second communicating port 4B of the cylinder plate 25 via a connector 61A, and the other end thereof is connected to the second connecting port 7B of the connecting plate 50 via a connector 61B. With such a configuration, the second communicating port 4B is communicated with the second connecting port 7B via the second hose pipe 61.

Each of the connectors 60A, 60B, 61A, and 61B is configured of, for example, a banjo bolt in which a passage for allowing passage of the working oil is formed inside. Each of the connectors 60A, 60B, 61A, and 61B is not limited to the banjo bolt, and for example, it may also be configured of a swivel joint, etc.

As described above, the rod side chamber 1 of the hydraulic cylinder 10 communicates with the first valve port 6A of the valve block 40 through the first communicating port 4A of the cylinder body 22, the first cylinder port 5A of the cylinder plate 25, the first hose pipe 60, and the first connecting port 7A of the connecting plate 50. The bottom-side chamber 2 of the hydraulic cylinder 10 communicates with the second valve port 6B of the valve block 40 through the second communicating port 4B of the cylinder body 22, the second cylinder port 5B of the cylinder plate 25, the second hose pipe 61, and the second connecting port 7B of the connecting plate 50. Thus, the working oil discharged from the pump 32 is guided to the rod side chamber 1 or the bottom-side chamber 2 from either one of the first and second valve ports 6A and 6B, and the working oil discharged from the rod side chamber 1 or the bottom-side chamber 2 is guided to the tank 33 from the other of the first and second valve ports 6A and 6B. Thereby, the hydraulic cylinder 10 is extended or contracted.

In addition, as shown in FIG. 1, the connecting plate 50 is formed with attachment holes 51 each serving as an attachment portion for attaching the driving unit 30 to an attachment target member (for example, a base part 102 and a moving part 103, which will be described later) to which the driving unit 30 is to be attached. In other words, the connecting plate 50 also exhibits a function as the attachment member for attaching the driving unit 30, in addition to a function as the connecting member to which the first and second hose pipes 60 and 61 are connected for guiding the working oil to the first and second valve ports 6A and 6B of the valve block 40.

In addition, as shown in FIGS. 4 and 5, on the attachment surface 40A of the valve block 40, the relative positional relationship between the first valve port 6A and the second valve port 6B matches the relative positional relationship between the first communicating port 4A and the second communicating port 4B of the cylinder body 22 of the hydraulic cylinder 10 (the relative positional relationship between the first cylinder port 5A and the second cylinder port 5B of the cylinder plate 25). In other words, as shown in FIG. 5, two axes O2 and C2 that are mutually orthogonal are set on the attachment surface 40A of the valve block 40, and the first valve port 6A and the second valve port 6B are provided so as to be point-symmetrical with each other about an intersection point P2 of the axis O2 and the axis C2. The axis O2 is the axis that extends along the direction in which the electric motor 31, the pump 32, the valve block 40, and the tank 33 are arranged adjacently (the left-right direction in FIG. 5), and the axis O2 extends through the center between the first valve port 6A and the second valve port 6B. In addition, the axis C2 is the axis that is orthogonal to the axis O2 and that extends through the center between the first valve port 6A and the second valve port 6B.

In addition, a pitch (a center-to-center distance) between the first valve port 6A of the valve block 40 and the second valve port 6B matches a pitch between the first cylinder port 5A and the second cylinder port 5B of the cylinder body 22. Furthermore, the distance between the first valve port 6A and the second valve port 6B in the first direction along the axis O2 matches the distance between the first cylinder port 5A and the second cylinder port 5B along the center axis O1 direction (the distance=L1). In addition, the distance between the first valve port 6A and the second valve port 6B in a second direction along the axis C2 matches the distance between the first cylinder port 5A and the second cylinder port 5B along the axis C1 (the distance=L2).

With such a configuration, in the electric fluid pressure cylinder 100, it is also possible to attach the cylinder body 22 to the valve block 40 directly without using the first and second hose pipes 60 and 61 such that the first valve port 6A communicates with the first cylinder port 5A and such that the second valve port 6B communicates with the second cylinder port 5B. In other words, it is also possible to attach the cylinder body 22 to the valve block 40 directly such that the axis O1 shown in FIG. 4 matches the axis O2 shown in FIG. 5 and the axis C1 shown in FIG. 4 matches the axis C2 shown in FIG. 5. With such a configuration, it is possible to configure the entire electric fluid pressure cylinder 100 into the single unit by integrating the hydraulic cylinder 10 with the driving unit 30.

Figure 7:
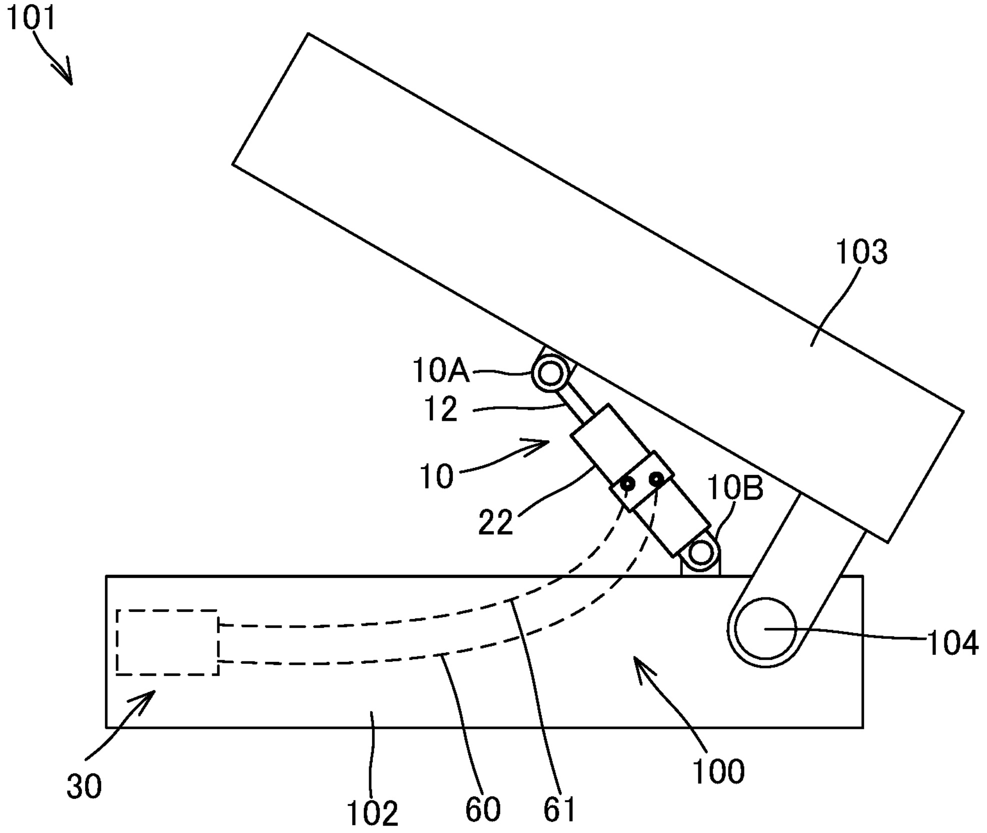
FIG. 7 is a schematic view showing a configuration of a moving structure body according to the embodiment of the present invention.
Figure 8:
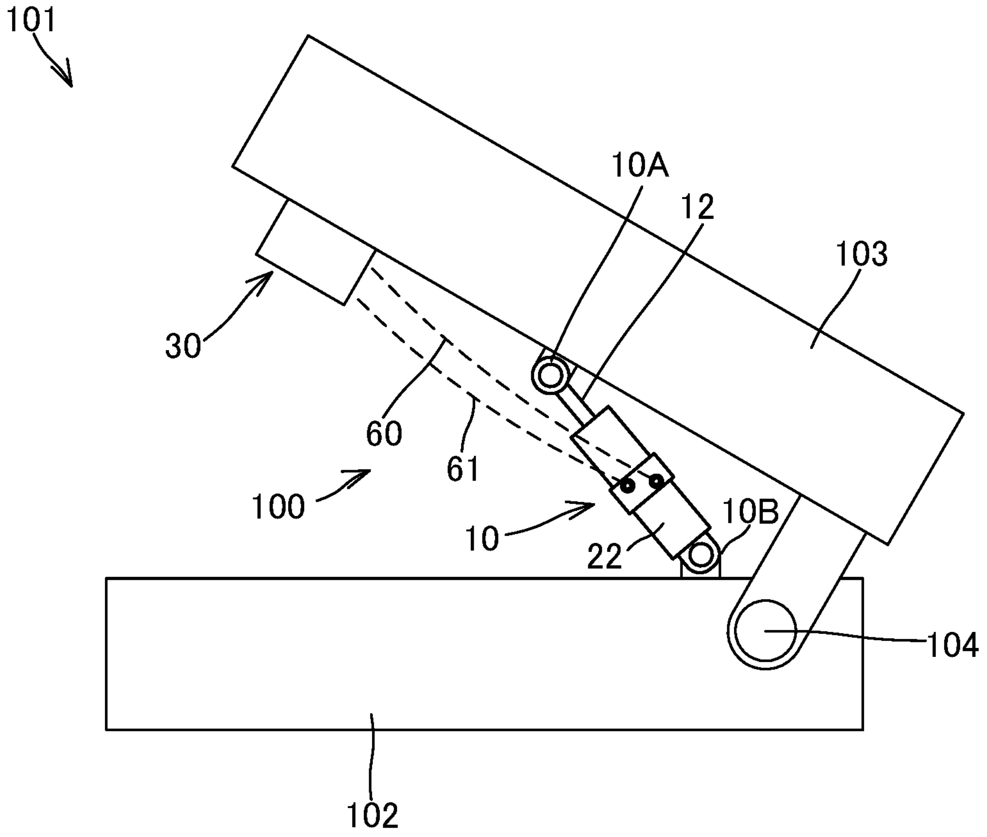
FIG. 8 is a schematic view showing a configuration of the moving structure body according to a first modification of the embodiment of the present invention.
Figure 9:
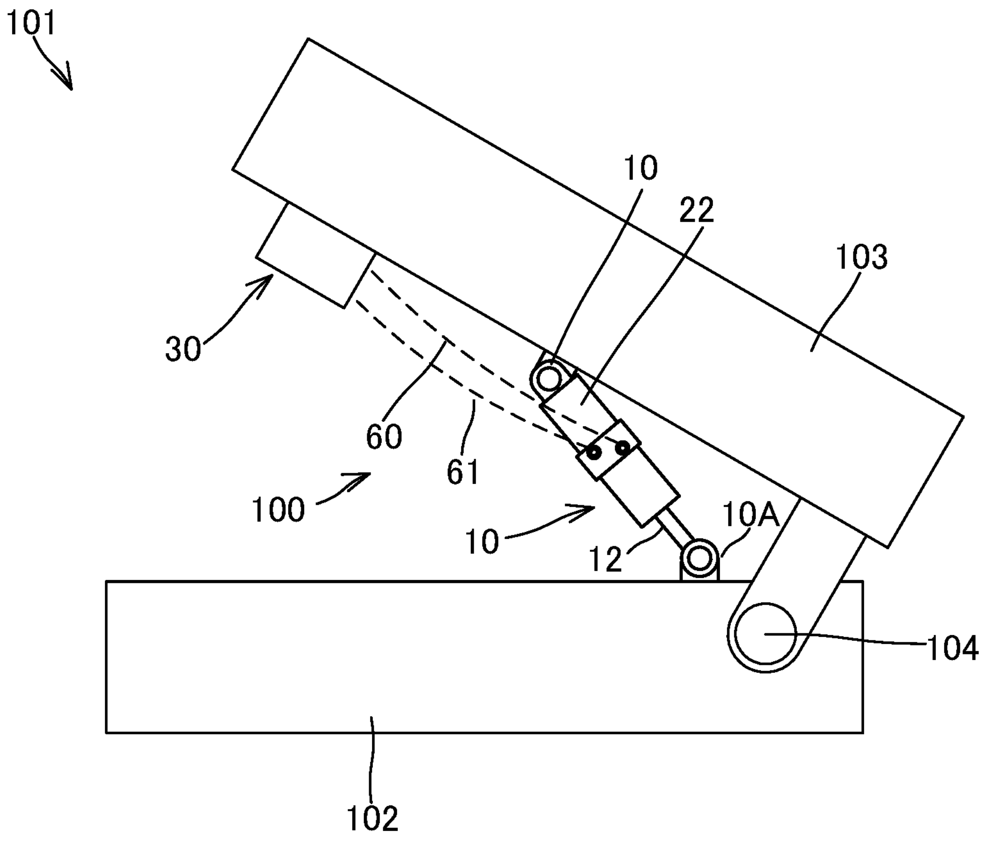
FIG. 9 is a schematic view showing a configuration of the moving structure body according to a second modification of the embodiment of the present invention.

Next, the moving structure body 101 provided with the electric fluid pressure cylinder 100 will be described with reference to FIG. 7. In FIG. 7 and FIGS. 8 and 9, which will be described below, the driving unit 30, and the first and second hose pipes 60 and 61 are illustrated in a simplified manner.

The moving structure body 101 is provided with the electric fluid pressure cylinder 100, the base part 102, and the moving part 103 that is rotationally moved relative to the base part 102 by the electric fluid pressure cylinder 100.

The base part 102 is fixed so as not to be movable, and the moving part 103 is attached to the base part 102 so as to be freely rotatable about a rotation pivot 104.

The driving unit 30 of the electric fluid pressure cylinder 100 is attached to the base part 102. Specifically, by attaching the connecting plate 50 to the base part 102 via the attachment holes 51, the driving unit 30 is attached to the base part 102. In addition, the cylinder body 22 of the hydraulic cylinder 10 is attached to the base part 102 via the clevis 10B so as to be freely rotatable, and the tip end of the piston rod 12 is attached to the moving part 103 via the clevis 10A so as to be freely rotatable.

With such a configuration, as the hydraulic cylinder 10 is extended and contracted, the moving part 103 is rotationally moved relative to the base part 102 about the rotation pivot 104.

According to the embodiment mentioned above, the advantages described below are afforded.

In the electric fluid pressure cylinder 100, the hydraulic cylinder 10 is connected to the driving unit 30 by the first and second hose pipes 60 and 61. Therefore, the driving unit 30 can be arranged at the position away from the hydraulic cylinder 10, and thus, a space for arranging the driving unit 30 is not required in the vicinity of the hydraulic cylinder 10, and it is possible to attach the hydraulic cylinder 10 even at a relatively small space. Thus, for the electric fluid pressure cylinder 100, the freedom of the arrangement layout is improved, while maintaining the compact configuration as a whole. In addition, because the attachment orientation of the driving unit 30 is not affected by the attachment orientation of the hydraulic cylinder 10, it is possible to easily prevent the tank 33 from being arranged in a downward-facing state (a state in which supply/discharge ports of the tank 33 are located on the lower side in the vertical direction with respect to the tank 33).

In addition, the driving unit 30 is connected to the first and second hose pipes 60 and 61 via the connecting plate 50 in which the first and second connecting ports 7A and 7B are formed. Therefore, in the connecting plate 50, it is possible to adjust the attachment orientation of the driving unit 30 by changing the shape and/or the position of the first and second connecting ports 7A and 7B to be formed, and so, the freedom of the arrangement layout of the driving unit 30, and in turn, of the electric fluid pressure cylinder 100 is improved.

In addition, the hydraulic cylinder 10 is of a twin-tube type, and the first and second communicating ports 4A and 4B of the cylinder body 22 of the hydraulic cylinder 10 and the first and second connecting ports 7A and 7B of the valve block 40 of the driving unit 30 are formed so as to have the same pitch with each other. Thus, in the electric fluid pressure cylinder 100, the hydraulic cylinder 10 and the driving unit 30 can also be integrated as a whole, without using the first and second hose pipes 60 and 61, by connecting the hydraulic cylinder 10 with the valve block 40 directly such that the first and second communicating ports 4A and 4B are respectively communicated with the first and second connecting ports 7A and 7B. Thus, the electric fluid pressure cylinder 100 can also be utilized in the same manner as the conventional electric fluid pressure cylinder 100 in which the hydraulic cylinder 10 and the driving unit 30 are integrated together.

In addition, in the moving structure body 101, the driving unit 30 and the cylinder body 22, to which the first and second hose pipes 60 and 61 are connected, are attached to the base part 102, and the piston rod 12 is attached to the moving part 103. As described above, because the driving unit 30 and the cylinder body 22 are provided on the same member (the base part 102 in the above-mentioned embodiment) among the base part 102 and the moving part 103, which are moved relative to each other, even if the moving part 103 and the base part 102 are moved relatively, the relative positional relationship between the driving unit 30 and the cylinder body 22 is not changed significantly. Thus, because there is no need to configure the first and second hose pipes 60 and 61 to be excessively long in order to absorb the change in the relative positional relationship between the driving unit 30 and the cylinder tube 21, it is possible to reduce the cost.

Next, modifications of this embodiment will be described with reference to FIGS. 8 to 10.

(1) First Modification

In the above-mentioned embodiment, the driving unit 30 is attached to the base part 102.

In contrast, in the first modification shown in FIG. 8, the driving unit 30 is attached to the moving part 103. In the first modification, it is preferred that the driving unit 30 be arranged such that the tank 33 is not orientated in the downward-facing state even if the moving part 103 is rotated.

In such a first modification, because the cylinder body 22 is provided on the base part 102 and the driving unit 30 is provided on the moving part 103, the relative position between the cylinder body 22 and the driving unit 30 is changed due to the relative movement of the base part 102 and the moving part 103. Because the first and second hose pipes 60 and 61 have the flexibility, the change in the relative position between the cylinder body 22 and the driving unit 30 as described above can be allowed. In order to allow the change in the relative position between the cylinder body 22 and the driving unit 30 with ease, it is preferred that the first and second hose pipes 60 and 61 be sufficiently long so as not to be tensioned.

(2) Second Modification

In the above-mentioned embodiment, the driving unit 30 is attached to the base part 102. In addition, in the hydraulic cylinder 10, the cylinder body 22 is attached to the base part 102, and the tip end of the piston rod 12 attached to the moving part 103.

In contrast, in a second modification shown in FIG. 9, the driving unit 30 is attached to the moving part 103. In addition, in the hydraulic cylinder 10, the cylinder body 22 is attached to the moving part 103, and the tip end of the piston rod 12 is attached to the base part 102.

With such a second modification, because the driving unit 30 and the cylinder body 22 are attached to the moving part 103, even if the moving part 103 is rotated relative to the base part 102 as the hydraulic cylinder 10 is extended and contracted, the relative position between the driving unit 30 and the cylinder body 22 (the cylinder plate 25) undergoes little change. Thus, there is no need to make the lengths of the hose pipes excessively long in order to allow deformation of the hose pipes due to the movement of the moving part 103. Thus, it is possible to make the length of the hose pipes shorter.

(3) Third Modification

In the above-mentioned embodiment, the relative positional relationship between the first valve port 6A and the second valve port 6B are set so as to match the relative positional relationship between the first communicating port 4A and the second communicating port 4B of the cylinder body 22 of the hydraulic cylinder 10. In contrast, this configuration is not essential.

Figure 10:
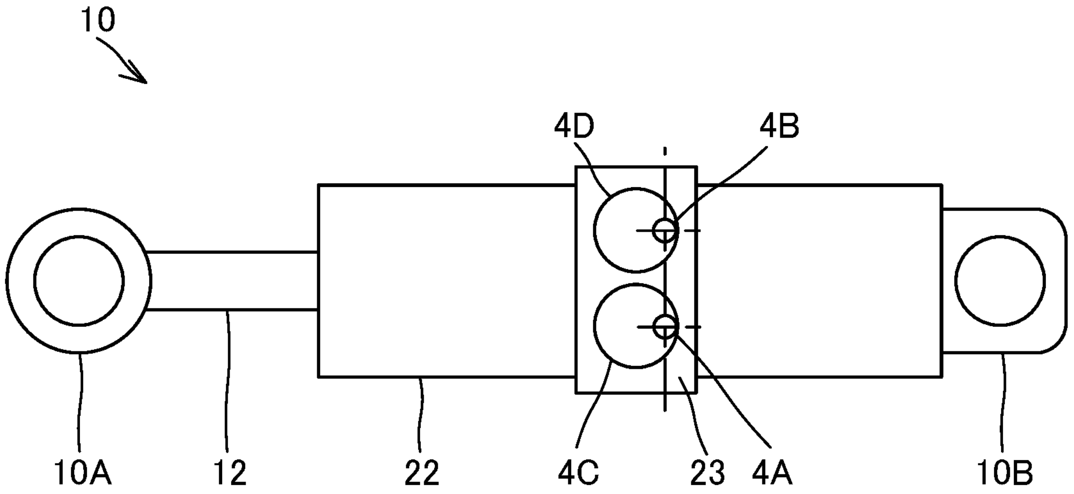
FIG. 10 is a plan view of the hydraulic cylinder according to a third modification of the embodiment of the present invention.

For example, as in a third modification shown in FIG. 10, the first communicating port 4A and the second communicating port 4B may be configured so as to open at the attachment surface 23 through opening ports 4C and 4D formed in the attachment surface 23 of the cylinder body 22, respectively. The opening ports 4C and 4D are circular holes whose one ends open at the attachment surface 23, and the other ends thereof are respectively connected to the first communicating port 4A and the second communicating port 4B. In this case, a pair of opening ports 4C and 4D may respectively be formed so as to have larger inner diameter than the first communicating port 4A and the second communicating port 4B, and the first valve port 6A and the second valve port 6B may be configured so as to communicate with the first communicating port 4A and the second communicating port 4B, respectively, through the pair opening ports 4C and 4D. With such a configuration, as shown in FIGS. 5 and 10, even in a case in which the relative positional relationship between the first valve port 6A and the second valve port 6B does not match the relative positional relationship between the first communicating port 4A and the second communicating port 4B, it is possible to configure the electric fluid pressure cylinder 100 by connecting the hydraulic cylinder 10 with the valve block 40 directly.

(4) Other Modifications

Next, other modifications will be described.

In the above-mentioned embodiment, although the hydraulic cylinder 10 is the hydraulic cylinder of the twin-tube type and of a double acting type, the configuration is not limited thereto. For example, the hydraulic cylinder 10 may be a hydraulic cylinder of a single-tube type that is not provided with the cylinder body 22, but that is provided with the cylinder tube 21 only. In addition, the hydraulic cylinder 10 may be a hydraulic cylinder of a single acting type in which one of the rod side chamber 1 and the bottom-side chamber 2 is filled with the working oil and the other is filled with gas.

In addition, in the above-mentioned embodiment, the first modification, and the second modification, in the moving structure body 101, the moving part 103 is relatively rotated about the rotation pivot 104 with respect to the base part 102. In contrast, in the moving structure body 101, the moving part 103 may be relatively moved in one direction (translationally moved) with respect to the base part 102.

In addition, in the above-mentioned embodiment, the hydraulic cylinder 10 is provided with the cylinder plate 25. In contrast, the cylinder plate 25 is not an essential configuration. For example, the cylinder plate 25 may be omitted, and the connector 60A and 61A may be attached to the cylinder body 22 directly.

The configurations, operations, and effects of the embodiments of the present invention will be collectively described below.

The electric fluid pressure cylinder 100 is provided with: the driving unit 30 integrally provided with the electric motor 31 rotated by the electrical power supply, the pump 32 configured to discharge the working oil by being driven by the electric motor 31, and the tank 33 configured to store the working oil; the hydraulic cylinder 10 configured to be extended and contracted by the working oil supplied from the driving unit 30; and the pipe member (the first hose pipe 60, the second hose pipe 61) configured to guide the working oil between the driving unit 30 and the hydraulic cylinder 10, wherein the driving unit 30 is further provided with: the valve block 40 configured to control the flow of working fluid between the fluid pressure cylinder and the pump 32; and the connecting plate 50 attached to the valve block 40 and formed with the connecting port to which the pipe member is connected, the connecting port being configured such that the working fluid supplied to and discharged from the fluid pressure cylinder passes through the connecting port.

With this configuration, while the tank 33, the pump 32, and the electric motor 31 are made into the unit as the driving unit 30, the driving unit 30 is connected to the hydraulic cylinder 10 via the pipe member. Thus, the driving unit 30 can be provided at the position away from the hydraulic cylinder 10, and therefore, the space for arranging the driving unit 30 is not required in the vicinity of the hydraulic cylinder 10. Therefore, while maintaining the compact configuration of the electric fluid pressure cylinder 100 as a whole, it is possible to improve the freedom of the arrangement layout. In addition, the driving unit 30 is connected to the pipe member via the connecting plate 50 in which the ports are formed. Thus, by arbitrarily adjusting the positions for forming the ports on the connecting plate 50, it is possible to adjust the attachment orientation of the driving unit 30, and thereby, the freedom of the arrangement layout of the driving unit 30 is improved. Therefore, with the electric fluid pressure cylinder 100, the freedom of the arrangement layout is improved.

In addition, in the electric fluid pressure cylinder 100, the hydraulic cylinder 10 is the double acting cylinder extended and contracted by the fluid pressure in the first fluid pressure chamber and the second fluid pressure chamber, the connecting plate 50 is formed with, as fluid passages: the first connecting port 7A through which the working oil supplied to and discharged from the first fluid pressure chamber passes; and the second connecting port 7B through which the working oil supplied to and discharged from the second fluid pressure chamber passes, the first hose pipe 60 for guiding the working fluid passing through the first connecting port 7A and the second hose pipe 61 for guiding the working fluid passing through the second connecting port 7B are connected, as the pipe member, to the connecting member, the valve block 40 is formed with: the first valve port 6A configured to communicate with the first connecting port 7A and configured such that the working oil supplied to and discharged from the first fluid pressure chamber passes through the first valve port 6A; and the second valve port 6B configured to communicate with the second connecting port 7B and configured such that the working oil supplied to and discharged from the second fluid pressure chamber passes through the second valve port 6B, and the hydraulic cylinder

10 is provided with the cylinder plate 25, the cylinder plate 25 being formed with the first cylinder port 5A through which the working fluid supplied to and discharged from the first fluid pressure chamber passes and the second cylinder port 5B through which the working fluid supplied to and discharged from the second fluid pressure chamber passes.

In addition, in the electric fluid pressure cylinder 100, the hydraulic cylinder 10 has: the cylinder tube 21; the piston 11 freely slidably inserted into the cylinder tube 21, the piston 11 being configured to divide the interior of the cylinder tube 21 into the first fluid pressure chamber and the second fluid pressure chamber; the piston rod 12 connected to the piston 11; the cylinder body 22 arranged on the outer circumferential side of the cylinder tube 21; and the partitioning portion 24 configured to divide the annular space 3 between the cylinder tube 21 and the cylinder body 22 into the first outer pressure chamber 3A in communication with the first fluid pressure chamber and the second outer pressure chamber 3B in communication with the second fluid pressure chamber, and the cylinder body 22 is formed with: the first communicating port 4A configured to allow the first outer pressure chamber 3A to communicate with the first cylinder port 5A of the cylinder plate 25; and the second communicating port 4B configured to allow the second outer pressure chamber 3B to communicate with the second cylinder port 5B of the cylinder plate 25.

In addition, in the electric fluid pressure cylinder 100, the pitch between the first cylinder port 5A and the second cylinder port 5B in the hydraulic cylinder 10 and the pitch between the first valve port 6A and the second valve port 6B in the valve block 40 are formed so as to match with each other.

With this configuration, it is also possible to configure the electric fluid pressure cylinder 100 by directly connecting the hydraulic cylinder 10 with the valve block 40. Thus, the freedom of the arrangement layout for the electric fluid pressure cylinder 100 is further improved.

In addition, in the electric fluid pressure cylinder 100, the connecting plate 50 is provided with the attachment holes 51 for attaching the driving unit 30 to the attachment target member to which the driving unit 30 is to be attached (the base part 102, the moving part 103).

With this configuration, the connecting plate 50 to which the first and second hose pipes 61 are attached can also function as the attachment member for attaching the driving unit 30, and so, it is possible to reduce the number of parts.

In addition, the moving structure body 101 is provided with: the electric fluid pressure cylinder 100; the base part 102; and the moving part 103 moved by the electric fluid pressure cylinder 100 relative to the base part 102, wherein the electric fluid pressure cylinder 100 is provided with: the driving unit 30 integrally provided with the electric motor 31 rotated by the electrical power supply, the pump 32 configured to discharge the working oil by being driven by the electric motor 31, and the tank 33 configured to store the working fluid; the hydraulic cylinder 10 configured to be extended and contracted by the working oil supplied from the driving unit 30; and the pipe member configured to guide the working oil between the driving unit 30 and the hydraulic cylinder 10, wherein the hydraulic cylinder 10 has the cylinder tube 21 and the piston rod 12 moved rearward and forward relative to the cylinder tube 21, the moving part 103 is attached with the driving unit 30 and the cylinder tube 21 of the hydraulic cylinder 10, and the base part 102 is attached with the piston rod 12 of the fluid pressure cylinder.

With this configuration, because the driving unit 30 and the cylinder tube 21 of the hydraulic cylinder 10, to which the pipe members are respectively connected, are attached to the same moving part 103, even if the moving part 103 and the base part 102 are moved relatively, the relative positional relationship is not changed significantly. Thus, because there is no need to configure the pipe member to be excessively long in order to absorb the change in the relative positional relationship between the driving unit 30 and the cylinder tube 21, it is possible to reduce the cost.

Embodiments of this invention were described above, but the above embodiments are merely examples of applications of this invention, and the technical scope of this invention is not limited to the specific constitutions of the above embodiments.

This application claims priority based on Japanese Patent Application No. 2020-74248 filed with the Japan Patent Office on Apr. 17, 2020, the entire contents of which are incorporated into this specification.

The invention claimed is:

1. An electric fluid pressure cylinder, comprising:

a driving unit integrally provided with an electric motor rotated by an electrical power supply, a pump configured to discharge a working fluid by being driven by the electric motor, and a tank configured to store the working fluid;

a fluid pressure cylinder configured to be extended and contracted by the working fluid supplied from the driving unit; and a first pipe and a second pipe configured to guide the working fluid between the driving unit and the fluid pressure cylinder, wherein the driving unit further includes:

a valve block configured to control flow of the working fluid between the fluid pressure cylinder and the pump, and having a first valve port and a second valve port through which the working fluid from or to the tank passes; and a driving unit connecting member attached to the valve block and having a first connecting port that connects the first valve port to the first pipe and a second connecting port that connects the second valve port to the second pipe, the fluid pressure cylinder including:

a cylinder tube;

a piston slidably inserted into the cylinder tube, the piston being configured to divide an interior of the cylinder tube into a first fluid pressure chamber and a second fluid pressure chamber;

a piston rod connected to the piston;

an outer tube arranged at an outer circumferential side of the cylinder tube, and having a first communication port and a second communication port;

a partitioning portion configured to divide a space between the cylinder tube and the outer tube into a first outer pressure chamber connected to the first communication port and a second outer pressure chamber connected to the second communication port, the first outer pressure chamber and the second outer pressure chamber being respectively connected to the first fluid pressure chamber and the second fluid pressure chamber, a cylinder connecting member having a first cylinder port that connects the first communication port to the first pipe and a second cylinder port that connects the second communication port to the second pipe, and the fluid pressure cylinder is a double acting cylinder, and the valve block controls a position of the piston by controlling a fluid pressure of the working fluid that is supplied to and discharged from the first and second fluid pressure chambers either:

through the first outer pressure chamber, the first communication port, the first cylinder port, the first pipe, the first connecting port and the first valve port; or through the second outer pressure chamber, the second communication port, the second cylinder port, the second connecting port and the second valve port.

2. The electric fluid pressure cylinder according to claim 1, wherein the driving unit connecting member is an attachment portion for attaching the driving unit to an attachment target member to which the driving unit is to be attached.

3. The electric fluid pressure cylinder according to claim 1, wherein the driving unit connecting member is detachable from the valve block.

4. An electric fluid pressure cylinder, comprising:

a driving unit integrally provided with an electric motor rotated by an electrical power supply, a pump configured to discharge a working fluid by being driven by the electric motor, and a tank configured to store the working fluid;

a fluid pressure cylinder configured to be extended and contracted by the working fluid supplied from the driving unit; and a first pipe and a second pipe configured to guide the working fluid between the driving unit and the fluid pressure cylinder, wherein the driving unit includes:

a valve block configured to control flow of the working fluid between the fluid pressure cylinder and the pump, and having a first valve port and a second valve port through which the working fluid from or to the tank passes; and a driving unit connecting member attached to the valve block and having a first connecting port that connects the first valve port to the first pipe and a second connecting port that connects the second valve port to the second pipe, the fluid pressure cylinder including:

a first fluid pressure chamber and a second fluid pressure chamber, a cylinder connecting member having a first cylinder port and a second cylinder port that are respectively connected to the first pipe and the second pipe, a first communication port disposed between the first fluid pressure chamber 1 and the first cylinder port; and a second communication port disposed between the second outer pressure chamber and the second cylinder port, the fluid pressure cylinder is a double acting cylinder, and the valve block controls a position of the piston by controlling a fluid pressure of the working fluid that is supplied to and discharged from the first and second fluid pressure chambers either:

through the first outer pressure chamber, the first communication port, the first cylinder port, the first pipe, the first connecting port and the first valve port: or through the second outer pressure chamber, the second communication port, the second cylinder port, the second connecting port and the second valve port, and a distance between central axes of the first communication port and the second communication port in the fluid pressure cylinder and a distance between central axes of the first valve port and the second valve port in the valve block are the same.

5. The electric fluid pressure cylinder according to claim 4, wherein the fluid pressure cylinder includes a cylinder body in which the first and second fluid pressure chambers and the first and second communication ports are formed, the cylinder connecting member being detachable from the cylinder body, and the first and second valve ports of the valve block are directly connectable to the first and second communication ports of the fluid pressure cylinder.

6. The electric fluid pressure cylinder according to claim 4, wherein shapes and sizes of the first communication port and the second communication port are identical to shapes and sizes of the first valve port and the second valve port, respectively, so that the first communication port is directly connectable to the first valve port, and the second communication port is directly connectable to the second valve are directly connectable.

7. The electric fluid pressure cylinder according to claim 4, wherein the driving unit connecting member is detachable from the valve block.

* * * * *